United States Patent
Marr, Jr. et al.

(10) Patent No.: US 6,240,337 B1
(45) Date of Patent: May 29, 2001

(54) FLYWHEEL RESERVE POWER FOR OUTSIDE PLANT OF A COMMUNICATION NETWORK

(75) Inventors: William P. Marr, Jr., Laurel, MD (US); Frederick G. Hofman, Jr., Downingtown; John J. Serowatka, Elkins Park, both of PA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/053,676

(22) Filed: Apr. 2, 1998

(51) Int. Cl.[7] .................................................. H02J 1/14
(52) U.S. Cl. ........................ 700/286; 713/320; 713/340
(58) Field of Search ..................... 700/286, 287, 700/288, 289, 295, 296, 297, 298; 713/300, 310, 320, 321, 322, 323, 324, 330, 340, 260, 262, 266, 264; 307/64; 455/67.1

(56) References Cited

U.S. PATENT DOCUMENTS

| | | | |
|---|---|---|---|
| 4,617,507 | | 10/1986 | Eisenhaure et al. . |
| 4,649,287 | | 3/1987 | Nola . |
| 5,295,078 | * | 3/1994 | Stich et al. ........................... 364/483 |
| 5,381,554 | * | 1/1995 | Langer et al. ........................ 713/300 |
| 5,384,792 | * | 1/1995 | Hirachi ................................... 371/66 |
| 5,612,580 | * | 3/1997 | Janonis et al. ......................... 307/64 |
| 5,930,779 | * | 7/1999 | Knoblock et al. .................... 705/412 |
| 5,942,811 | * | 8/1999 | Stumfall et al. ........................ 307/64 |
| 5,990,577 | * | 11/1999 | Kamioka et al. ....................... 307/26 |
| 5,994,794 | * | 11/1999 | Wehrlen ................................. 307/66 |
| 6,023,152 | * | 2/2000 | Briest et al. .......................... 323/207 |

* cited by examiner

Primary Examiner—Thomas Lee
Assistant Examiner—Rijue Mai
(74) Attorney, Agent, or Firm—McDermott, Will & Emery

(57) ABSTRACT

To eliminate problems caused by the use of batteries for back-up power in outside plant facilities of a communication network or the like, the batteries are replaced with flywheel reserve power systems, in accord with the invention. Specific applications of flywheel power systems include flywheel systems to supply power to the optical terminal of a digital loop carrier type system, for a telephone network. Other applications relate to flywheel systems to supply power to optical network units (ONUs) in fiber to the curb or fiber to the home type communication networks. In the preferred embodiments, the flywheel power systems include intelligent components for monitoring and controlling operations of the power systems. Communication links are provided, to enable the monitoring and control components to report status to and receive control instructions from a centralized network control or management center.

14 Claims, 9 Drawing Sheets

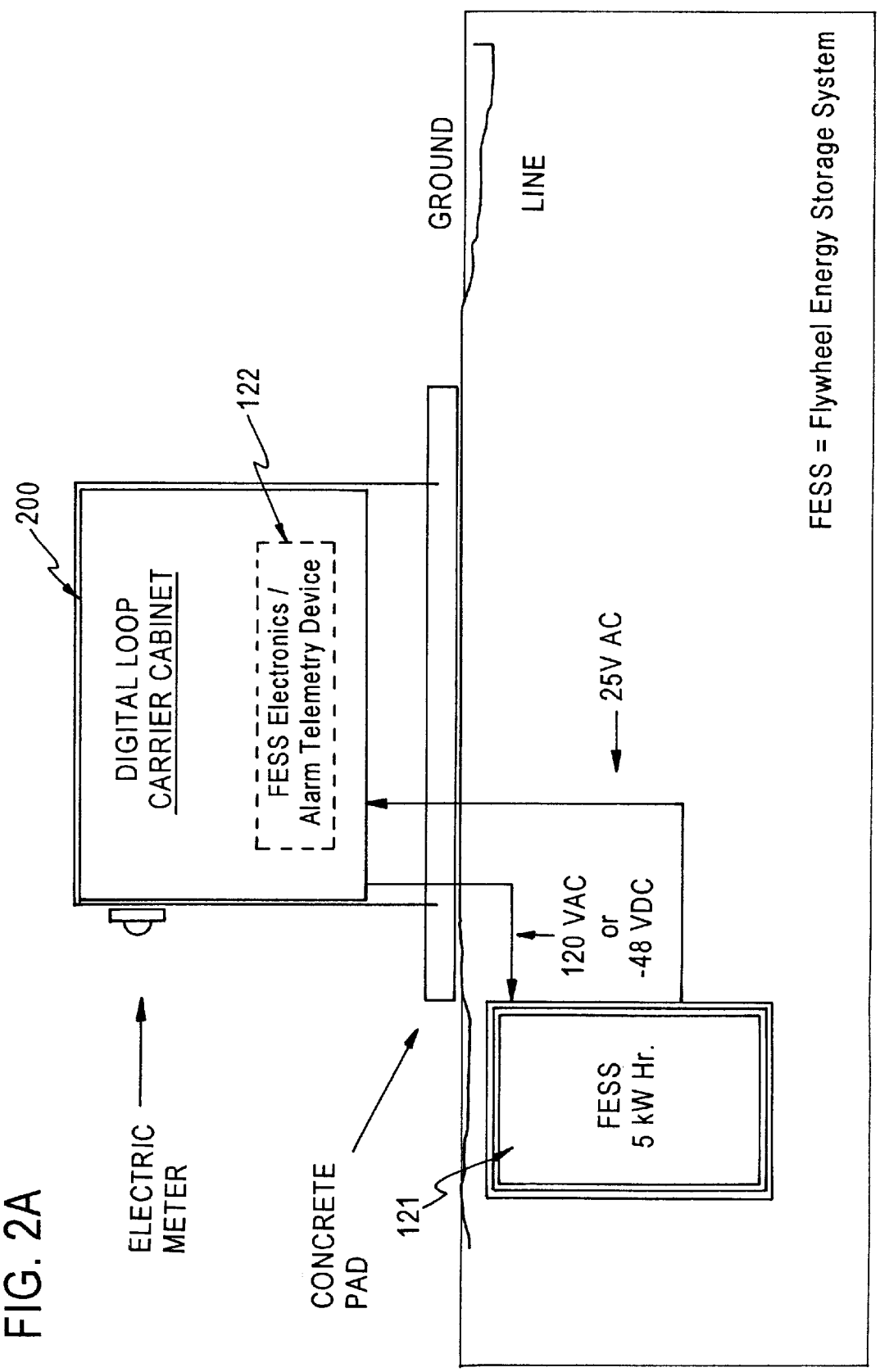

FLYWHEEL RESERVE POWER FOR OUTSIDE PLANT OF A COMMUNICATION NETWORK

TECHNICAL FIELD

The present invention relates to a flywheel reserve power system employed as a back-up power source in the outside plant facilities of a communication network, and more particularly, to power systems for such telephone network components as an optical terminal in a fiber optic distribution system.

BACKGROUND ART

Telecommunications companies have the responsibility of providing reliable communication services that today's society critically depends on in its daily activities. To minimize potential service interruptions, reserve power systems have become standard industrial practice in the telecommunications companies' efforts to maintain extremely high network reliability and availability. In keeping with this notion, subscribers have come to view communication services as a basic and vital utility in similar light as electricity; thus, any disruption of service would substantially impair productivity and cause undue incovenience. These services include basic telephone and data communication services for transacting business and satisfying personal needs.

To provide these essential services, communication providers rely on their outside plant facilities in reaching the subscribers. The outside plant encompasses all physical cable and electronics required to connect customers to the switching equipment in the Central Offices. As digital communications and its applications (e.g., video teleconferencing, Internet access, data network connectivity, etc.) become more prevalent, the demand on the telecommunications companies' outside plant will be much greater in terms of deployment of fiber optic cables and related equipment. This equipment, however, draws greater power than the familiar copper wire technology, and thereby, necessitates a higher capacity back-up power.

To meet the demand for uninterrupted service, telecommunications companies have traditionally utilized batteries as the reserve power system to curb potential power disruptions. The Valve Regulated Lead Acid (VRLA) battery represents a popular reserve power system for today's outside plant. VRLA batteries allow sustained telephone service capability for some duration of outage of normal power, so that a technician can be dispatched to restore the power. However, this duration varies unpredictably at times. With the sophistication of the evolving outside plant facilities, larger and thus heavier batteries are required.

Unfortunately, battery systems possess a number of technical and operational drawbacks with respect to network performance, reliability, and cost. Because of the variable environmental conditions (e.g., extreme temperatures) of the outside plant, batteries suffer from a relatively short life and require substantial routine maintenance. Battery life is reduced by heat degradation, which may result in a decreased life by as much as 50 percent. Low temperature also adversely affects the storage capacity of batteries.

In addition, the shortened battery life can be attributed to the fact that batteries undergo frequent deep discharging and recharging. Discharging occurs when the back-up power is triggered and supplies power to the active network equipment. At times, this discharging of the battery continues for a significant duration until service of the AC mains generator power is restored. Once restored, the battery undergoes a recharging process. The continual cycle of discharging and recharging eventually degenerates the battery's full capacity—an inherent characteristic of electrochemical processes.

Also, because power disruptions occur quite frequently in short spurts, the batteries are discharged and recharged repeatedly for brief periods. This causes the batteries to experience "memory" effects, a phenomenon whereby battery capacity is reduced because the battery is not fully discharged before recharging. When a fully charged battery discharges for a short duration, it "remembers" the recharge cycle time and recharges only for this shortened duration even if the battery has not been fully recharged. "Memory" effects are more pronounced in certain combination of metals and electrolytes than other usually more expensive combinations of metals and electrolytic solutions.

The consequence of having so many variable factors bearing on battery life is that life cycle costs cannot be predicted reliably. For example, a battery projected to be replaced every five years may in fact have to be replaced at shorter intervals than projected; e.g., three years. Frequent battery replacement imposes significant costs for the replacement units and associated labor.

Another drawback of the battery system concerns inadequate monitoring capabilities. The ability to monitor battery back-up power systems is severely limited to "dumb" information. That is, no information can be gathered on the batteries' life, amount of stored energy, or environmental temperature other than total system failure. Hence, prediction of its maintenance and replacement cycle is problematic. Because of the lack of "intelligent" monitoring capability, these battery systems require continuous on-site maintenance and manual monitoring, which detrimentally impacts operational costs.

A further disadvantage is that batteries pose severe environmental hazards due to leakage and disposal. For instance, under certain conditions, the batteries may release explosive hydrogen gas.

As an effective alternative for reserved power systems, flywheel energy storage systems (FESS) have been explored in a few esoteric applications. Eisenhaure et al. (U.S. Pat. No. 4,617,507) describes a self-regulating energy storage system involving a flywheel attached to a motor/generator. The flywheel stores energy during surplus power conditions and returns it to the motor/generator during low power conditions. Eisenhaure further discloses the application of this energy storage system in satellite systems. The Nola Patent (U.S. Pat. No. 4,649,287) discusses the use of a FESS in a spacecraft. Essentially, the flywheel operates a motor as a generator when solar energy power is unavailable.

There have been suggestions to use flywheel power in land based communication networks, but actual systems have not been developed to provide power for specific types of outside plant equipment. The high level suggestions, for example, have not addressed specific optical terminal system power or how to automatically monitor and manage reserve power systems in the outside plant. On the whole, these suggestions aim to effect industry standards for flywheel systems' specification in communications networks—employing ONUs, fiber-to-the-home (FTTH), fiber-to-the-curb (FTTC), and digital loop carrier (DLC) systems—without regard to detailed implementation.

It is thus evident that little or no work has been done to fully integrate flywheel technology into modern fiber optic based communication networks.

Accordingly, there exists a need for a practical back-up power system that is intelligently managed, predictable, relatively light weight, and specifically adapted to wide scale use in the outside plant of communication networks.

A void exists to better minimize the power interruptions that inheres in outside plant power.

There is a need to more efficiently maintain service capability during power failures.

A need exists for a reserve power system which will facilitate implementation of fiber optic technology down to the subscribers.

A reserve power system is needed that can more quickly recharge and is free from life shortening phenomena such as memory effects as well as temperature and discharging/recharging induced degradations.

In addition, there exists a need to utilize environmentally safe reserved power systems.

DISCLOSURE OF THE INVENTION

The present invention meets the above noted needs by providing a flywheel system as the back-up power source for the outside plant of a communication network. A typical flywheel system, also called flywheel energy storage system (FESS), comprises two modules: the flywheel module and the flywheel electronics module. The flywheel module constitutes the actual mechanical motor/generator system that is typically based on a permanent-magnet-brushless design. This electromechanical system is controlled and monitored by the flywheel electronics module.

The flywheel systems basically serve as direct replacements for the traditional battery back-up systems. In the event of power failure, the flywheel systems supply power to the active components of the outside plant. These active optical components, which are not resident in the central switching offices, can collectively be referred to as optical terminals. The term, optical terminals, encompasses remote terminals of digital loop carrier type equipment, optical network units (ONUs) as well as other fiber based remote terminals.

Under normal operations, the optical terminals draw power from the power utility company's alternating current (AC) grid, or mains generator power. The 240 V AC feed is inputted to a full-wave rectifier, thereby converting the 240 V AC to −48 V DC, for example. The −48 V DC from the rectifier supplies power to the electronic components of the optical terminal as well as to the flywheel electronics module, which in turn charges the flywheel module. The charging process continues until the flywheel module (acting as a motor) attains rated speed; at which time, the flywheel module is ready to act as a generator when called upon to do so by the flywheel electronics module.

In the usual case, back-up power is triggered when the AC grid ceases for whatever reason to supply ample voltage to maintain the operations of the optical terminals. The cessation of power can be from brown outs, black outs, or deliberate load shedding, which is a controlled shut off of the AC mains generator power. Once the AC voltage drops below an unacceptable level, the flywheel electronic module signals the flywheel module to discharge. This discharged power feeds into the optical terminal power supply circuit. The flywheel system continues to supply back-up power until the mains generator power is restored. Once restored, the flywheel acts as a motor to recharge its stored energy back up to full capacity. Because the recharging process is not based on an electrochemical process, it is free from any memory effects that plague battery systems.

The flywheel system in accord with the invention has a significantly more advanced monitoring and management system than traditional battery systems. The monitoring system collects data, for example, regarding the flywheel system's environmental condition, spin rate, input and output voltages, and operational status. After processing and analyzing the system status data, the monitoring system reports the amount of reserve power available and any potential problems requiring maintenance and repair. System status data may extend to information about other systems in the network as well. Other functionalities include fault detection, alarm generation, and performance monitoring. Because of the sophisticated capabilities of the monitoring system, the system allows several preventative measures to be taken to decrease or eliminate downtime of the optical terminals caused by power failures. A key aspect of the monitoring system involves the ability to automatically regulate the system's load shedding capability.

The present invention is advantageous in that it provides the ability to monitor the back-up system to determine preventative maintenance and to ensure proper system performance.

Another advantage involves the flywheel system's long operational life, as it is immune from the negative effects of frequent deep discharging and recharging, and memory effects.

A further advantage of the invention is the capability to recharge quickly.

In addition, the present invention greatly minimizes the impact of extreme environmental conditions (e.g., high and low temperature extremes).

Yet another advantage arises from the flywheel system's environmentally safe operations.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 2A is a diagram of flywheel system implementation involving a digital loop carrier cabinet in a preferred embodiment.

BEST MODE FOR CARRYING OUT THE INVENTION

The present invention provides for more efficient and environmentally friendly implementation of a back-up, or reserved, power system for optical terminals in a modern communication network. Optical terminals pervade the outside plant of modern networks that seek to ubiquitously avail subscribers of the benefits of fiber optic technology. A popular approach towards that end is through the deployment of ONUs. As fiber optic technology continues to come down in cost, fiber-to-the-curb (FTTC), fiber-to-the-home (FTTH), and wireless local loop are foreseeable applications whose implementations depend on a durable and light weight reserve power system of the remote optical terminals. This need is met by the flywheel energy storage system.

The flywheel system, in simplistic terms, behaves as an electromechanical battery whereby the energy is stored as kinetic energy in a high-speed rotating flywheel. A typical 2 kWH unit spins the flywheel at 30,000 RPM. Structurally, the typical flywheel system consists of a cylindrical vacuum housing, which holds a carbon-fiber composite flywheel, axial and radial magnetic bearings, and a motor/generator. These high precision components contribute to the high system design life, which can exceed 20 years.

The power and control electronics executes a number of critical functions. It performs bidirectional power conversion from DC to three-phase variable frequency AC to excite the flywheel during its motor operations. During generator operations, the electronics ensures a constant output voltage independent of the FESS's load. Furthermore, the electronics oversees the internal system protection, shutting down the unit if any one of the following parameters exceed a predetermined threshold: speed, balance, operating power, output voltage, output current, or temperature. These system status parameters can also be exported to a remote monitoring system for analysis.

In the present invention, the electronics is physically apart from the flywheel housing. The separation adds flexibility in implementation choices; for example, the flywheel housing can be buried in the ground while the electronics remains above ground for accessibility by the technician. This modular architecture also allows the electronics to be upgraded irrespective of the advances in the mechanical structures of the system. In this manner, advances in management, monitoring, and control of the flywheel system can be realized independent of the development and production cycle of the entire flywheel system. Accordingly, the flywheel system can be divided into two modules: one module encompassing the mechanical system and the other the electronics, termed flywheel module and flywheel electronics module respectively.

Figure 1:
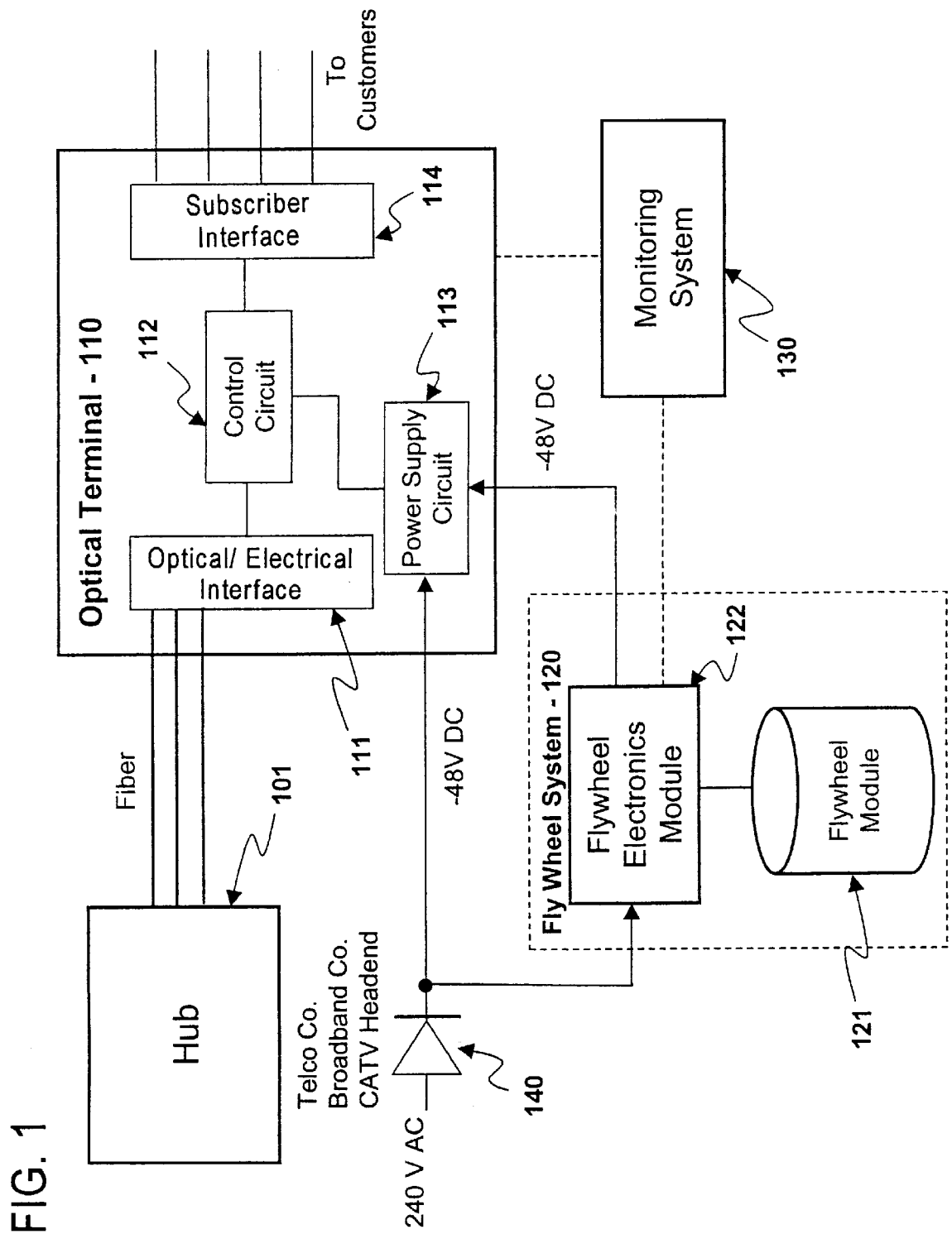
FIG. 1 is a schematic block diagram of a communication network with a flywheel system and a monitoring system in accord with the present invention.

FIG. 1 illustrates the preferred embodiment in which a hub 101 provides fiber optic links to an optical terminal 110. The hub refers generically to a communication distribution source such as a telephone company central office, a broadband company's inside plant facility such as a host digital terminal, or a CATV headend. The fiber links terminate at an optical/electrical interface 111 resident within the optical terminal 110. The terminal 110 also houses a control circuit 112, one or more subscriber interfaces 114, and a power supply circuit 113. The optical/electrical interface performs the necessary two-way signal conversion between optical and electrical for processing by the control circuit 112. The control circuit 112, among its many other functionalities, provides multiplexing and demultiplexing capabilities of subscriber channels. Such processed signals reach the subscribers through the subscriber interface 114.

Under normal operations, the power supply circuit 113 receives −48 V DC from the rectifier 140. The rectifier 140 converts the 240 V AC from the mains generator (not shown) to a −48 V DC output. Consistent with the invention, the equipment at the location of the remote terminal includes a flywheel system 120. In the event of a power disruption from the mains generator, the flywheel system 120 supplies the DC voltage to the power supply circuit 113.

Typically, the flywheel system is situated in close proximity to the optical terminal. The flywheel system 120 (FIG. 1) comprises the flywheel electronics module 122, and the flywheel module 121. As the intelligence of the flywheel system 120, the flywheel electronics module 122 monitors the DC voltage level from the rectifier 140 to determine when to trigger the discharge of stored kinetic energy in the flywheel module 121.

While in the stand-by mode, the flywheel module 121 functions as a motor and is charged to its rated speed. Upon reaching the rated speed (e.g., 30,000 RPM), the flywheel module 121 is fully charged. The flywheel module then operates as a generator when requested by the flywheel electronics module to discharge. The output of the flywheel system 120 is −48 V DC to the power supply circuit 113 of the optical terminal, thereby supplanting the temporary unavailability of the mains generator power.

In addition, the collective system in FIG. 1 includes a sophisticated monitoring system 130. The monitoring system 130 collects data about the flywheel system 120 through the flywheel electronics module 122. After data collection, the monitoring system 130 has the option of processing the information locally within the monitoring system 130. Alternatively, the monitoring system 130 may send the data to be processed remotely via the link to the optical terminal 110. The optical terminal 110 relays the data to the hub 101. Another possibility involves the monitoring system 130 sending processed data back to the hub 101. Although not shown, a remote monitoring center may reside within the hub or elsewhere.

One specific application of the invention (FIGS. 2A and 2B) relates to a reserve power system for the remote terminal of a digital loop carrier (DLC) system. Carrier systems serve to extend the loop distance out from the central office by multiplexing signals from several loops on a common media extending between the central office and a loop termination in the field. DLC technology emerged from a demand for higher quality of service and breadth of services over traditional analog carrier systems. These analog carrier systems provided an unreliable quality of service, were difficult to implement correctly, and maintained limited service offerings. DLC systems, however, utilize the inherent advantages of digital techniques to provide a range of services for diverse subscriber needs; for example, analog POTS, DS-0 switched 56, DS-1, ISDN basic-rate and primary-rate interface, and subrate data connectivity. Not only do the subscribers gain the performance benefits of digital transmission, but the network providers are able to reap substantial gains in terms of economy and network flexibility.

DLC systems serve high concentrations of subscribers per network component, while allowing flexibility of network configurations and promoting ease of maintenance. With digital technology, significantly more subscribers can have connectivity to the communication network through a single remote terminal. An important advantage of the DLC is its ability to support a drop-and-insert configuration. With this capability, several remote terminals can be daisy-chained with the head remote terminal linking only to a single local exchange terminal. The local exchange terminal resides in the hub or central office and provides a termination point for the remote terminal. Other configurations are also possible; such as a star, tree, mesh, or most any hybrid thereof. Such flexibility allows ease of adaptation and integration into existing architectures without drastic modifications. Another key feature of the DLC system is improved network maintainance—accomplished through software-based remote provisioning and network management features. In light of all of the above benefits, DLC systems play an integral role in modern telephony systems by helping to ensure that subscribers' voice and data communications requirements are satisfied.

The preferred embodiment for a DLC remote terminal, as illustrated in FIG. 2A, situates the FESS (or flywheel module) 121 below ground. The digital loop carrier terminal, which is enclosed in a cabinet 200, rests on a concrete pad. This implementation places the flywheel electronics module 122 inside the digital loop carrier cabinet 200. By housing the flywheel electronics module 122 inside the cabinet 200, the technician can readily monitor the flywheel system's performance and condition. In this case, the FESS is a 5 kWH unit, which provides continuous energy (25 V AC) to the DLC terminal for approximately eight hours. With a 5 kWH system, the technician has an eight hour time frame to take necessary corrective measures.

Figure 2B:
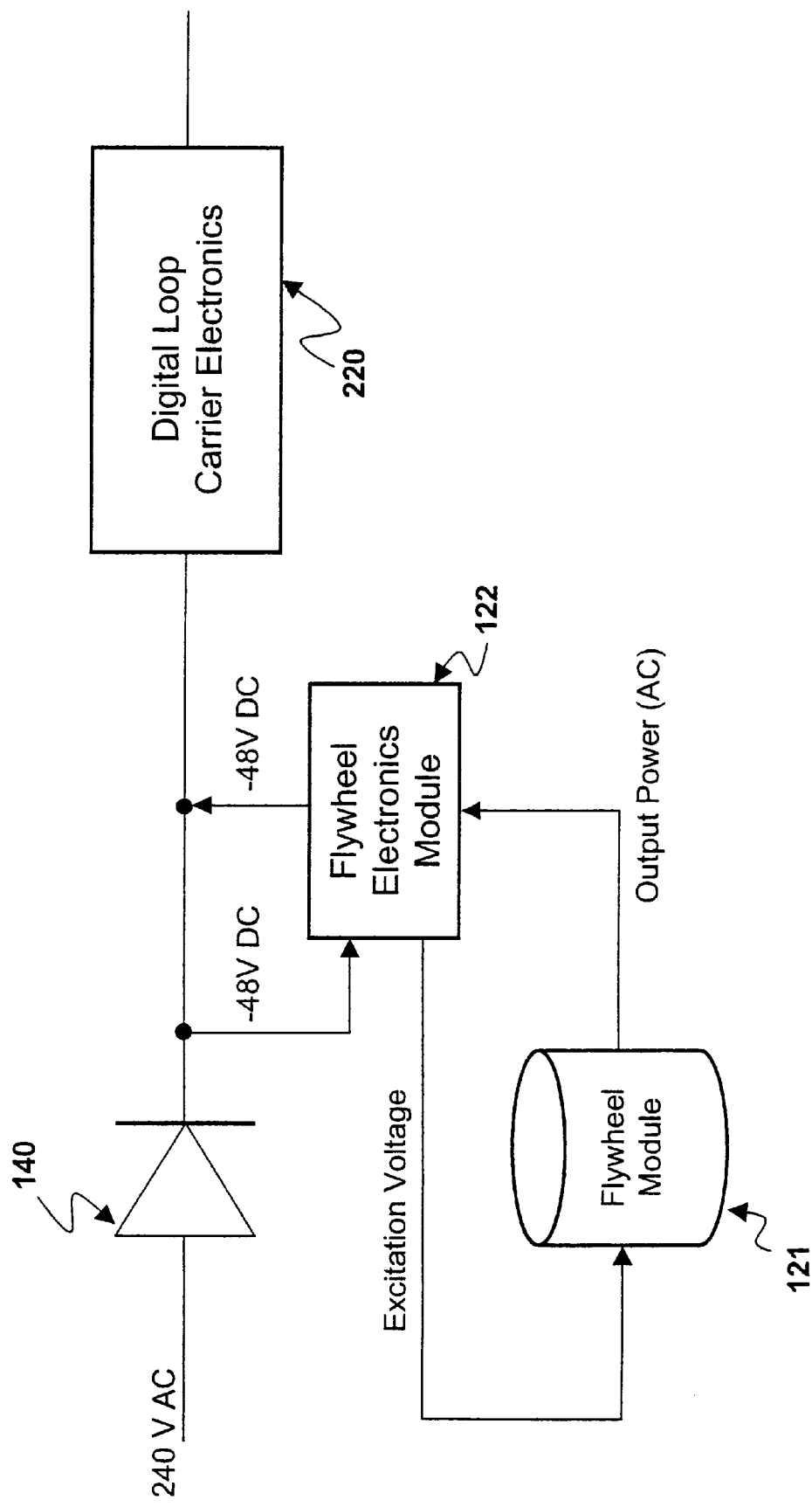
FIG. 2B is a simplified diagram of a flywheel system used in a digital loop carrier system, consistent with another embodiment.

FIG. 2B shows a high level relationship of the components within this implementation. Specifically, the rectifier 140 draws 240 V AC power from the mains generator and feeds −48 V DC to the digital loop carrier electronics 220 and the flywheel electronics module 122 in parallel. As shown, the flywheel electronics module 121 supplies the excitation voltage to the flywheel module 121 for proper charging. When required, the flywheel module outputs AC voltage to the flywheel electronics module 122. The flywheel electronics module 122 then converts the AC voltage to −48 V DC to the digital loop carrier electronics 220.

Another specific application of the invention provides reserve power for a number of optical network units. It may be helpful first to review the structure and operation of fiber networks which utilize ONUs.

In a typical optical fiber communication system, customer premises wiring connects telephone station equipment and/or broadband digital equipment to a central office switching system via a hardwired line. The line to the customer premises may take many different forms in the field, but most telephone circuit installations still utilize a twisted wire pair type loop or drop for at least the last 500 feet from some form of telephone line terminal into the customer premises. Broadband circuits may utilize twisted wire pairs or coaxial cables for the final drop into the customer premises.

A number of systems recently have been proposed for providing digitally multiplexed communications via fiber optic cables in telephone loop plant, between the central office and the customer premises. The optical fiber may extend to the curb or to the home of the customers. In a FTTC or FTTH type network, a central office switching system connects through optical subscriber loop circuitry to subscriber premises. The subscriber loop circuitry for a number of subscribers served by the central office includes two-way optical fiber pairs between the central office and an ONU. In an FTTC system, for example, one ONU serves a number of customer premises, e.g. 32 or 48 customer premises. A set or bundle of drop cable wires connects the ONU to each of the customer premises served by the particular ONU.

The ONU is the interface point between optical communications on the fibers and electrical signals on the drop cable wiring. As noted, the ONU connects to one or more fibers. To provide this connection, the ONU includes an appropriate number of optical/electrical interfaces. The ONU also includes a number of line cards providing the physical connection and electrical interface to the various drop cable circuits. Also, the ONU includes time division multiplexing/demultiplexing circuitry, to provide two-way digital routing between time slots or channels on the high speed fiber link and the line cards. The line cards and the time division multiplexing/demultiplexing circuitry are controlled by a programmed controller.

In the upstream direction, the ONU aggregates the digital signals from the line cards, converts the aggregate digital stream to optical form and transmits the optical signal over the fiber link. In the downstream direction, the ONU converts a received optical signal from link to electrical form, separates out digital signals for each service and applies those signals to the appropriate line cards.

The electronic components of the ONU, to perform the various processing functions, require electrical power. Normally, these electronic components draw power from the commercial AC grid. Any failure of power, without a suitable backup supply, would disable the ONU and interrupt all communications for the customers served through the particular ONU.

Figure 3A:
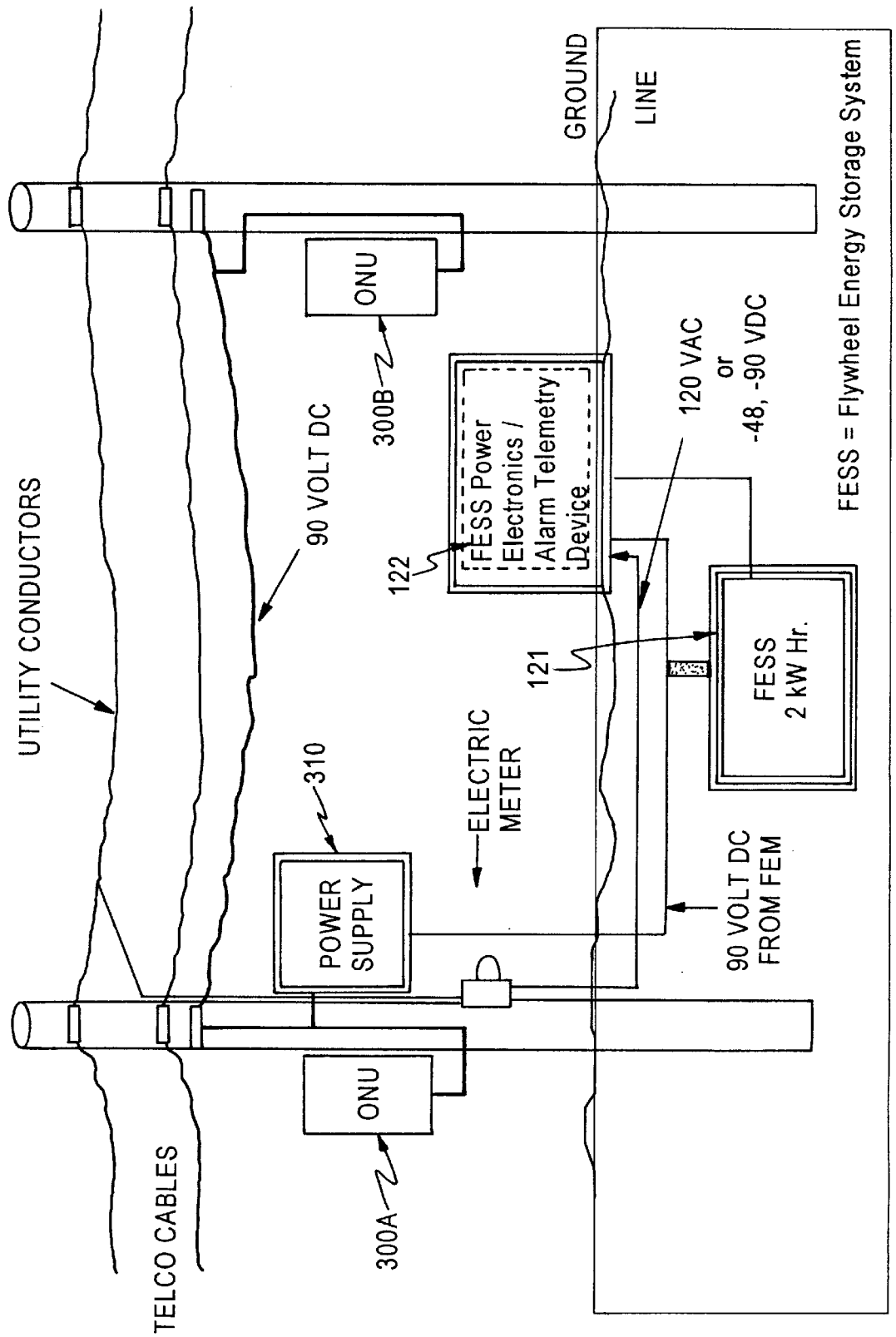
FIG. 3A is an illustration of the flywheel system used in a typical optical network unit implementation.

The ONU embodiment of the present invention concerns a below ground FESS supplying the backup power to multiple standalone ONUs, as shown in FIG. 3A. The FESS 121, a 2 kWH unit, provides 90 V DC via the flywheel electronics module 122 to a power supply 310 located on a telephone pole, which also has an ONU 300A hanging thereon. A 2 kWH unit is needed to supply two ONUs for an eight hour period. Power supply 310 also feeds an ONU 300B attached to an adjacent telephone pole. The flywheel electronics module 122 is housed in a cabinet above ground for ease of maintenance and draws power (120 V AC or −48 V DC, −90 V DC) from the feed on the telephone pole with the power supply 310.

Figure 3B:
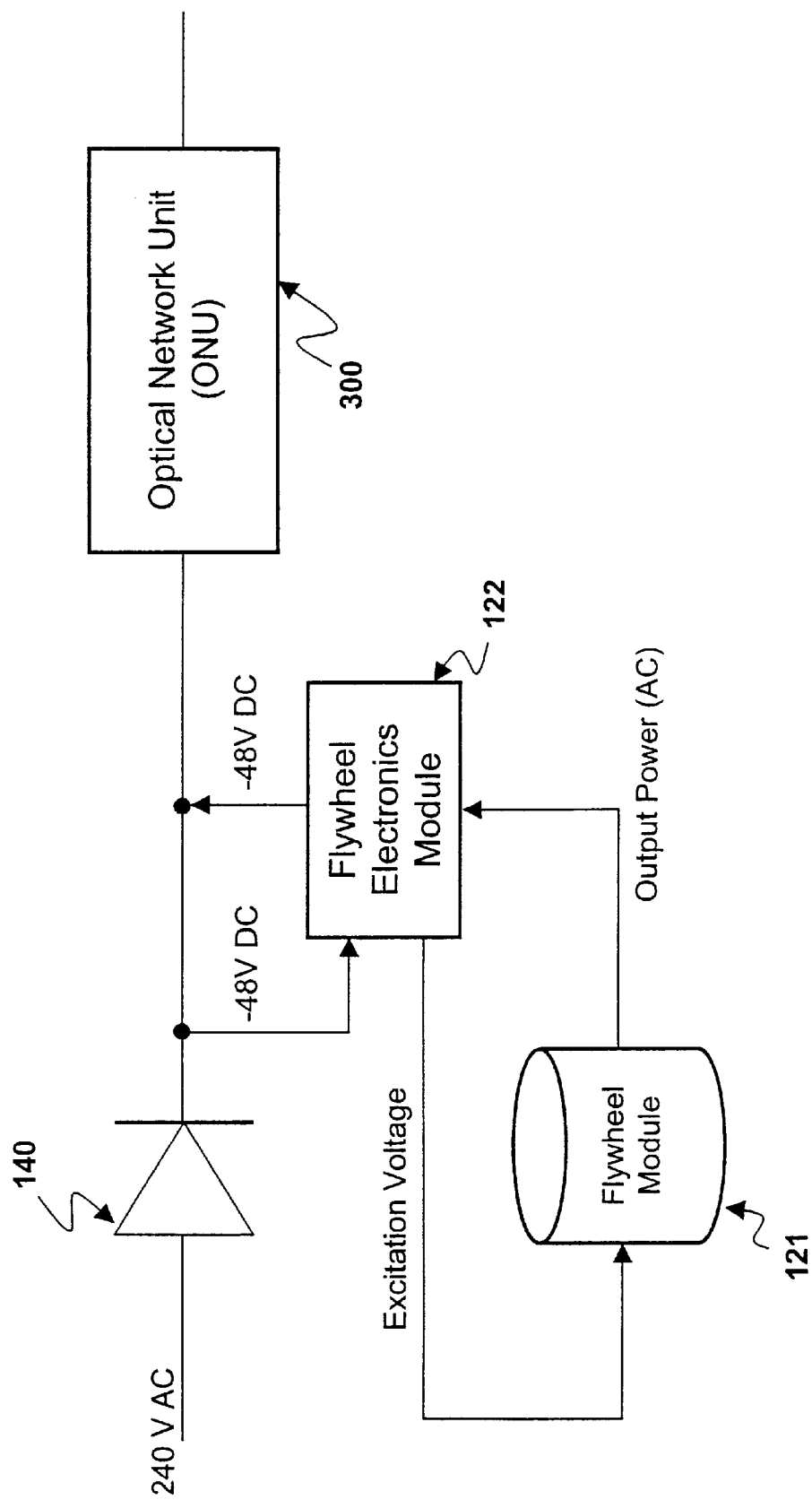
FIG. 3B is a simplified diagram of a flywheel system utilizing an optical network unit.

Extending this concept of ONUs sharing a common power source to a significantly larger scale, the FESS can be used to supply a power node, which in turn may power a great number of stand alone ONUs (e.g., over 30 units). The term power node designates a large power supply that supports a high concentration of network equipment. A typical power node outputs 90 V at 1 Hz over a coaxial distribution system to the ONUs. Because of the power requirement, a reserved power system's capacity would need to be in order of 40 kWH or greater. Another embodiment involving an ONU is captured in FIG. 3B, which illustrates a simplified high level overview of a single ONU implementation. The configuration is similar to that of FIG. 2B; however, the digital loop carrier electronics 220 is replaced by the ONU 300. The stand alone ONU 300 requires a 1 kWH FESS unit to supply it for a duration of eight hours. The mechanics of the operations and system functionality are basically identical to the system of FIG. 2B.

Figure 4:
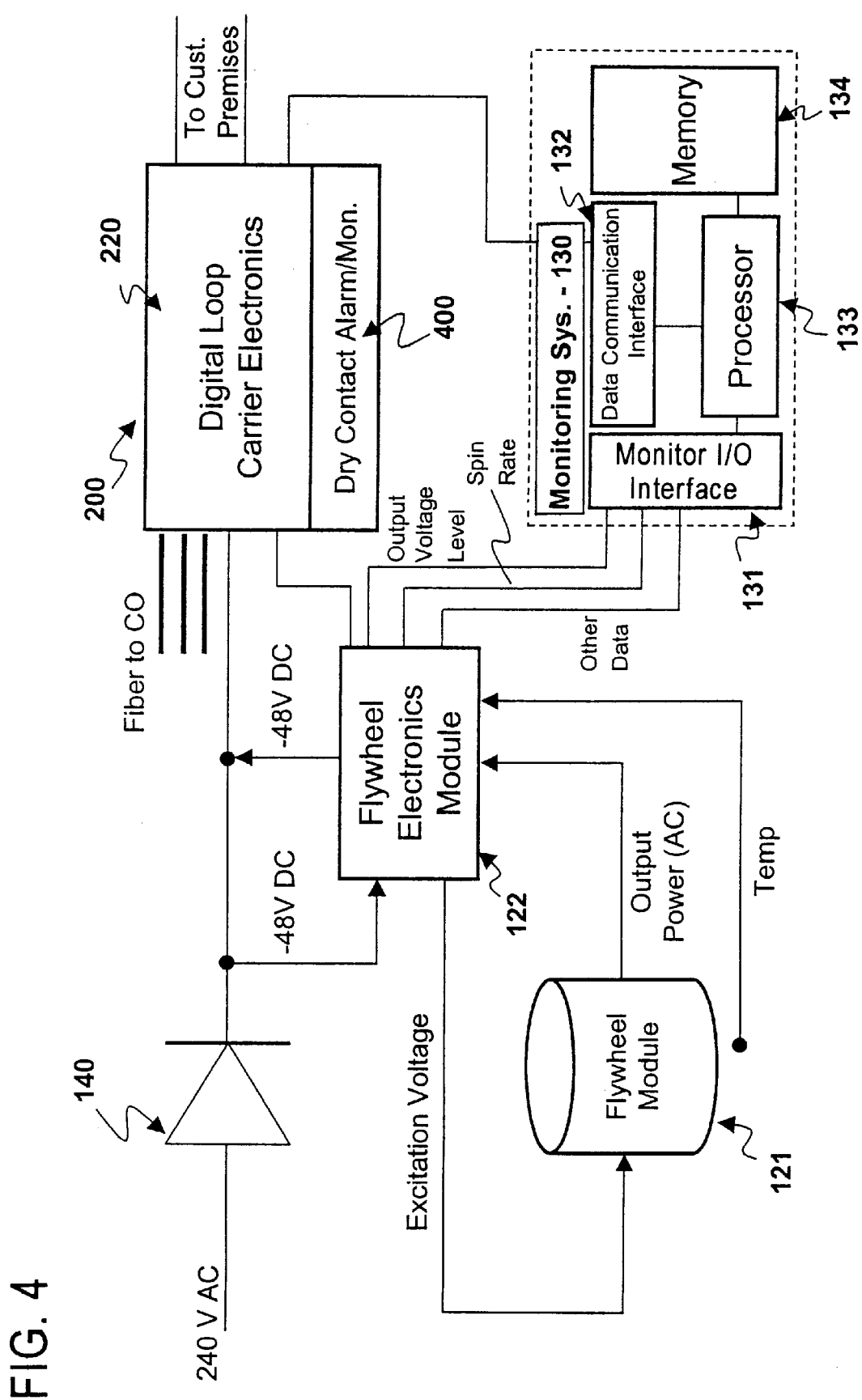
FIG. 4 is an illustration of the flywheel system with a monitoring system.

A key advantage of the FESS lies with its monitoring capabilities. FIG. 4 is a block diagram of a power control and monitoring system, in this example, for the remote terminal electronics of a digital loop carrier system. The monitoring system 130, as illustrated in FIG. 4, comprises four major components, a monitor I/O interface 131, a data communications interface 132, a processor 133 and a memory 134.

The monitor input/output interface 131 connects to the flywheel electronics module 122. Flywheel electronics modules, such as module 122, output a variety of information regarding the "health" of the associated flywheel module. The interface 131 enables the monitor 130 to receive such information from the electronics module 122. The electronics module supplies data representing such information as FESS output voltage level, spin rate, and temperature of the flywheel module. The data collection process can be executed in real-time or via batch processing. The monitor I/O interface 131 relays the information to the processor 133, which stores the information in memory 134 for processing.

Monitoring software instructs the processor 133 to either message the data or simply store it for data transmission. Additionally, instructions may emanate from an external source such as a Network Operations Center (NOC), which is described later in more detail. Upon receiving such instructions, the processor retrieves from memory 134 the collected data and transmits them to the data communication interface 132 for transport. The link between the data communication interface 132 and the digital loop carrier electronics 220 can be over a Plain Old Telephone Service (POTS) line, a dedicated point-to-point data line, or an Integrated Services Digital Network (ISDN) circuit. If POTS is utilized, the data communication interface 132 is a dial-up modem. Under the dedicated data line scenario, the data communication interface may be a combination of network interface card (NIC), Local Area Network (LAN) equipment (e.g., Ethernet or Token Ring), and Wide Area Network (WAN) equipment (e.g., packet assembler/disassembler, router, frame-relay switch, or ATM switch). For an ISDN circuit, the interface 132 would comprise an ISDN card.

Although the system in FIG. 4 employs relatively sophisticated monitoring tools for the power system, dry contact alarms and the associated monitoring sensors 400 in the digital loop carrier system can still be utilized to alert the network operations center of digital loop carrier electronics failure. The cabinet 200 houses the dry contact alarm system 400, whereby component failure triggers a binary signal to be sent to the monitoring system 130 for processing. The usual scenario involves the monitoring system 130 sending the alarm information to the NOC for technician dispatch.

Figure 5:
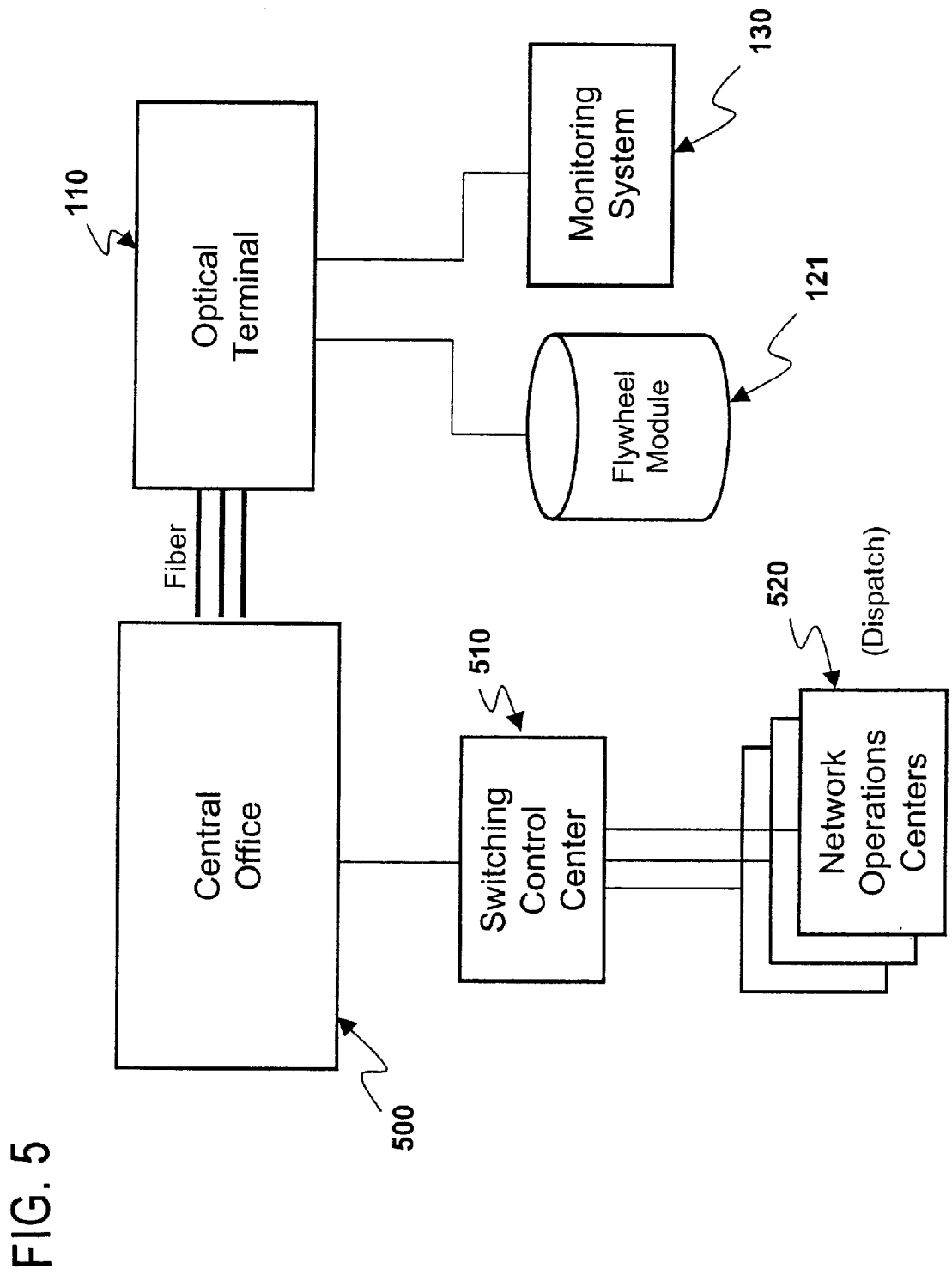
FIG. 5 is a high level block diagram of the interaction between the flywheel system, the monitoring system, and the operational facilities in a communication network.

FIG. 5 illustrates an overview of the monitoring network and the network support systems. The NOCs 520 control the monitoring system 130 remotely. NOCs are charged with maintaining the transport and network elements of a communication network. The switching control center (SCC) 510 serves as a concentration point for multiple network operations centers 520. The SCC 511 governs maintenance of centralized trunk and switching systems within a geographic area, thereby ensuring that trunks are available and function properly during call setup, call termination, and call routing. The NOCs monitor the respective segments of the overall communication network and manages the work force to respond to any alarms. The alarms may appear as a change in color of an LED display on a console or in a more sophisticated system as a flashing icon on a computer terminal, which then triggers a work force management system to dispatch a technician to that particular location.

The NOC and SCC play key roles in maintaining the quality of service offered by the communication network. The data collected by the monitoring system 130 is sent to the central office 500, which further relays the data to the switching control center 510. If a NOC 520 senses, for example, that a flywheel system is unable to reach a proper spin rate, it may dispatch a technician to perform repair work. Furthermore, based on the spin rate, the NOC can determine the amount of energy left in the flywheel system and can more efficiently schedule the technicians' work orders. In other situations, the NOC may send instructions to the monitoring system to initiate corrective action such as system reboot or reinitialization.

The flywheel system not only provides a superior back-up power system, but it can serve as a means to store energy for "resale" back to the utility company through a process called load shedding. During peak usage of electricity, the electric utility companies at times provide financial incentives to reduce commercial power consumption. The communications network provider can take advantage of these financial incentives by intentionally cutting off the power switch to the mains generator power (i.e., load shedding) and running off the back-up power system.

Figure 6:
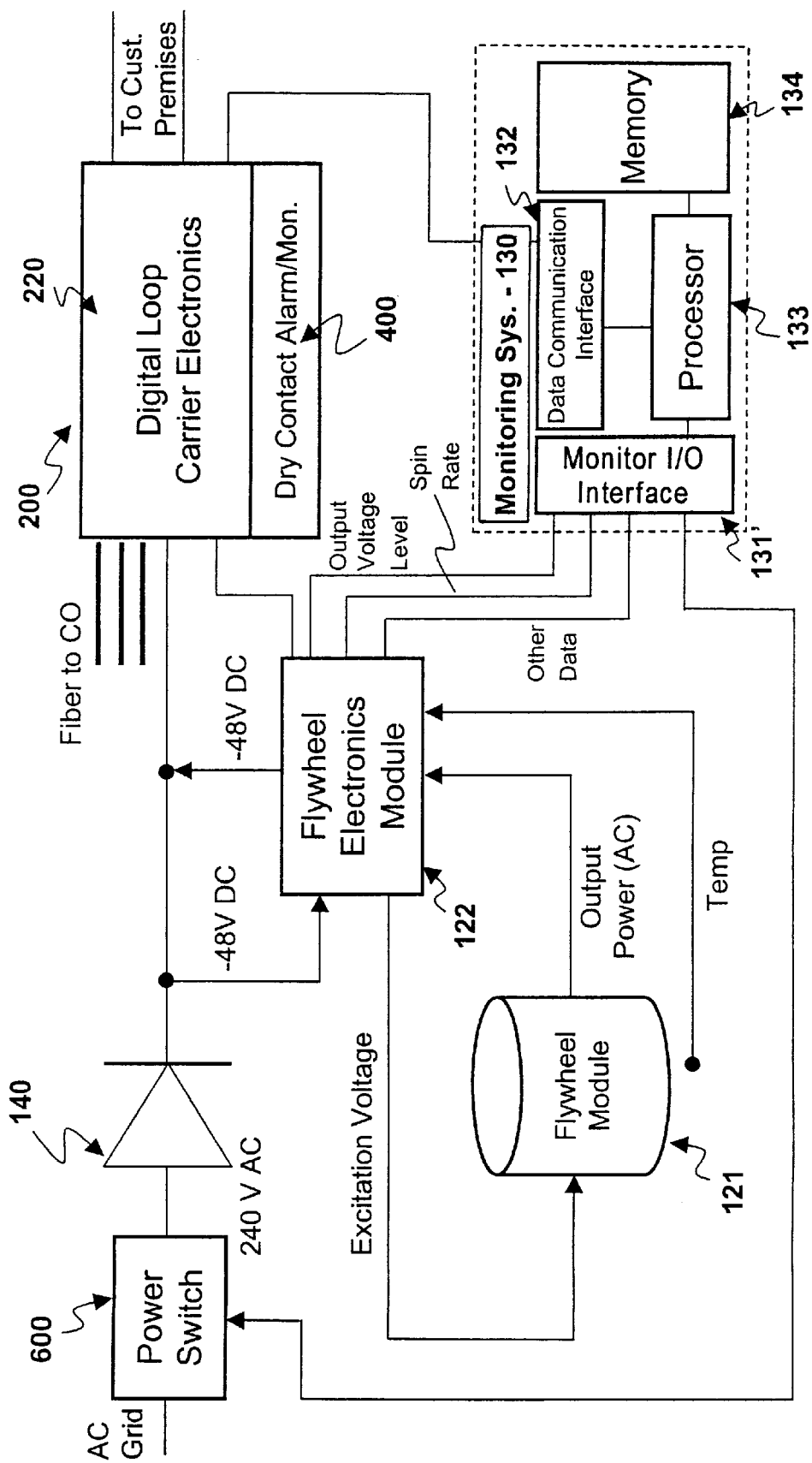
FIG. 6 is a diagram illustrating the communication between the monitoring system and a power switch.

FIG. 6 illustrates one method of load shedding facilitated by the present invention. The system shown in FIG. 6 is generally similar to the system of FIG. 4 discussed earlier. The monitor I/O interface 131', in this embodiment, also connects to a power switch 600, interposed in the mains power circuit upstream of the rectifier 140. The switch 600 thereby controls supply of AC power to the pertinent communication network segment. After determining that the flywheel module has sufficient stored energy, the processor 133 signals to the power switch 600 to suspend supplying power. At which time, the digital loop carrier electronics 220 is running off the flywheel system's reserved energy until the monitoring system 130 detects depletion of stored power dropping below an acceptable level. The processor 133 may execute this load shedding function under time control of a locally stored program or in response to a command received via the data communications interface 132, e.g., from a NOC.

Figure 7:
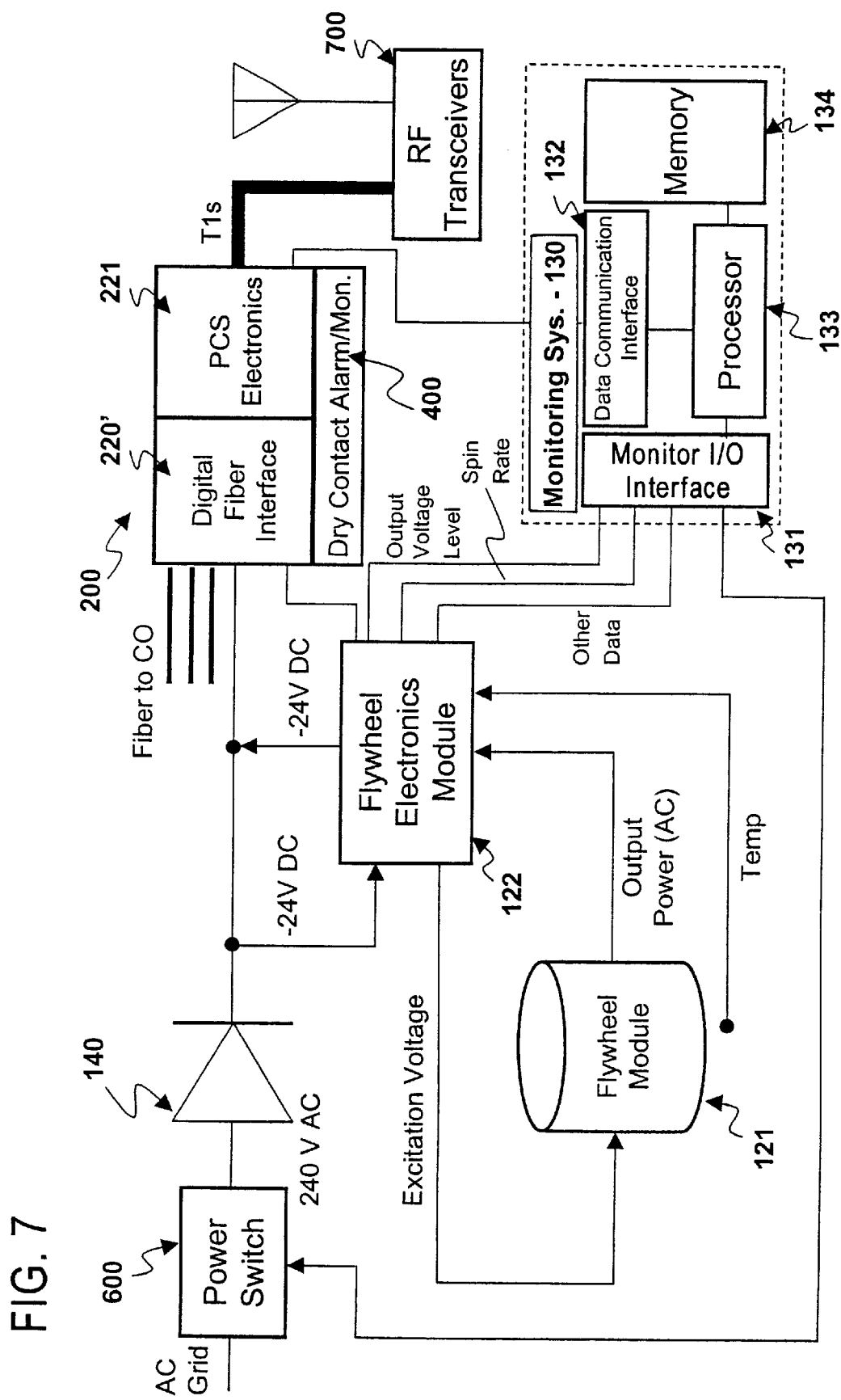
FIG. 7 is an illustration of a typical flywheel system implementation in a PCS/Cellular network.

Because of its versatility, the FESS in accord with the invention also can be readily adapted to a PCS/Cellular network, as illustrated in FIG. 7. Similar to the configuration in FIG. 6, the FESS 121, 122 connects to the monitoring system 130 and supplies power to the electronics in the cabinet 200. The rectifier 140 outputs −24 V DC, which is the voltage requirement of the PCS electronics 221. The digital fiber interface 220' coupled to the PCS electronics 221 provides T1 lines to the RF transceivers 700; these elements, 220', 221, and 700, constitute a cellular base station. A DTMF dialer (not shown) as part of the PCS electronics in the cabinet 200 responds to control signals received through the RF transceiver 700 to request telephone services, e.g., place a call. Needless to say, the operations of the PCS/cellular network continues transparent to the FESS's presence.

Although several preferred embodiments of the invention have been described in detail above, it should be clear that the present invention is capable of numerous modifications as would be apparent to one of ordinary skill in the art. Such modifications fall within the purview of the appended claims.

What is claimed is:

1. Outside plant equipment having reserve power, for use in a communication network, said outside plant comprising:
    an optical terminal for terminating an optical fiber communication link of the communication network and providing communication services over links to customer premises, the optical terminal having a control circuit coupled to a power supply circuit receiving mains generator power; and
    a flywheel power system having a flywheel module and a flywheel electronics module, the flywheel system being mounted in proximity to the optical terminal, the flywheel electronics module electrically connecting to the control circuit;

wherein the flywheel module is for receiving the mains generator power to reach and maintain rated speed, and upon disruption of the mains generator power such that the mains generator power falls below a threshold, the flywheel electronics module triggers the flywheel module to supply electric current as reserve power to the power supply circuit of the optical terminal.

2. A system as in claim 1, further comprising, a monitoring system having a monitor input/output interface coupled to a processor, and a data communication interface also coupled to the processor, wherein the monitor input/output interface electrically connects to the flywheel electronics module, and the data communication interface links to the optical terminal.

3. A system as in claim 2, wherein the monitor input/output interface is further linked to a power switch attached to the mains generator power, said monitoring system effecting load shedding capabilities.

4. A system as in claim 2, wherein the data communication interface is a modem.

5. A system as in claim 2, wherein the data communication interface connects to a data communication network.

6. A system as in claim 1, further comprising a cabinet, the cabinet containing the optical terminal and the flywheel electronics module, wherein the flywheel module is situated below ground in close proximity to the cabinet.

7. A communication system comprising:

at least one optical network unit (ONU) for terminating an optical fiber communication link from a hub and providing communication services over links to customer premises;

a power supply circuit for receiving mains generator power and coupling to the ONU;

a flywheel power system having a flywheel module and a flywheel electronics module, the flywheel system being mounted in proximity to the ONU, the flywheel electronics module electrically connecting to the power supply circuit; and the flywheel module for receiving the mains generator power to reach and maintain rated speed, upon disruption of the mains generator power such that the mains generator power falls below a threshold, the flywheel electronics module triggers the flywheel module to supply electric current to the power supply circuit of the ONU.

8. A system as in claim 7, further comprising, a monitoring system having a monitor input/output interface coupled to a processor, and a data communication interface also coupled to the processor, wherein the monitor input/output interface electrically connects to the flywheel electronics module, and the data communication interface links to the optical terminal.

9. A system as in claim 8, wherein the monitor input/output interface is further linked to a power switch attached to the mains generator power, said monitoring system effecting load shedding capabilities.

10. A communication system comprising:

at least one remote terminal of a digital loop carrier system for terminating a communication link from a hub and providing communication services over links to customer premises;

a power supply circuit for receiving mains generator power and coupling to the remote terminal;

a flywheel power system having a flywheel module and a flywheel electronics module, the flywheel system being mounted in proximity to the remote terminal, the flywheel electronics module electrically connecting to the power supply circuit; and the flywheel module for receiving the mains generator power to reach and maintain rated speed, upon disruption of the mains generator power such that the mains generator power falls below a threshold, the flywheel electronics module triggers the flywheel module to supply electric current to the power supply circuit of the remote terminal.

11. A system as in claim 10, further comprising, a monitoring system having a monitor input/output interface coupled to a processor, and a data communication interface also coupled to the processor, wherein the monitor input/output interface electrically connects to the flywheel electronics module, and the data communication interface links to the optical terminal.

12. A system as in claim 11, wherein the monitor input/output interface is further linked to a power switch attached to the mains generator power, said monitoring system effecting load shedding capabilities.

13. A reserve power system for loop plant electronics deployed in a communication network, comprising:

a flywheel power system for supplying back-up power, comprising,
  (1) a flywheel module for selectively alternating between receiving mains generator power to reach and maintain rated speed, and supplying power;
  (2) a flywheel electronics module for electrically connecting to a power supply circuit associated with the loop plant electronics and to the flywheel module, for controlling the flywheel module to discharge when the mains generator power falls below a threshold and providing status parameters of the flywheel power system;

a monitoring system for analyzing, processing, and reporting data related to the flywheel system, comprising,
  (1) a monitor input/output interface for physically connecting to the flywheel electronics module;
  (2) a processor coupled to the monitor input/output interface for controlling the monitoring system; and
  (3) a data communication interface being coupled to the processor, for transmitting report data via the communication network.

14. A system as in claim 13, further comprising a power switch connected to the mains generator power for effecting load shedding capabilities in conjunction with the monitoring system.

* * * * *